United States Patent Office 2,875,364
Patented Feb. 24, 1959

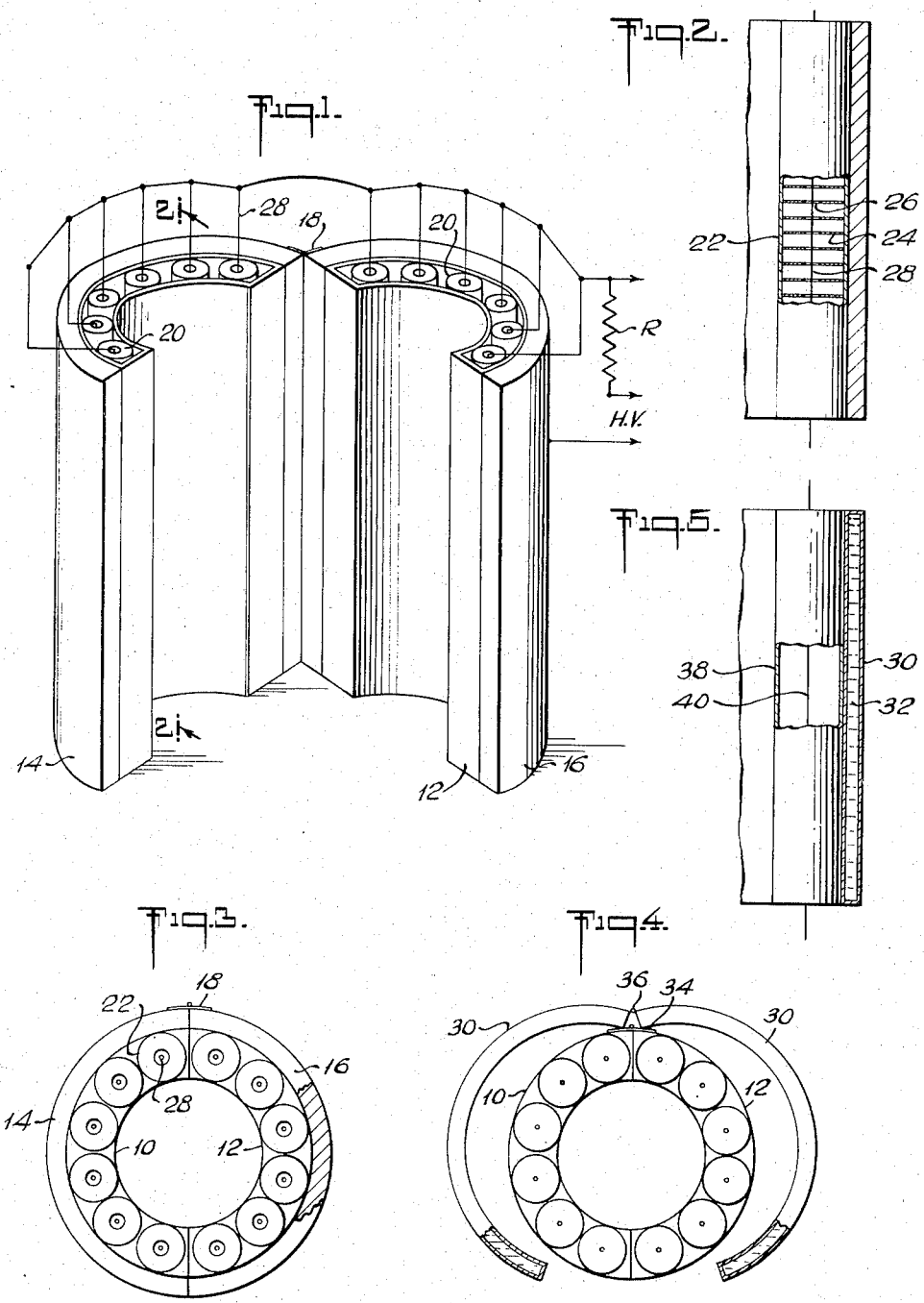

2,875,364
RADIATION DETECTOR

Gerhard Herzog, Houston, Tex., assignor to The Texas Company, New York, N. Y., a corporation of Delaware Application December 31, 1953, Serial No. 401,533

5 Claims. (Cl. 313—93)

This invention relates to the detection and measurement of penetrative radiation and more particularly to a detector responsive to substantially the total gamma radiation of a human body. The principal object of the invention is the provision of a gamma ray detecting device having a construction such that it can be positioned to surround a human body, and which device will be substantially insensitive to radiation other than that emitted from said body.

Radiation detectors adapted to respond to radiation emitted radially from objects such as ore specimens, bore hole core samples, rodents and other small animals have been developed but the provision of a sensitive radiation detector responsive to all of the radiation emitted from a human body involves many problems not present in the construction of the relatively small detectors.

There are many instances when a physician is interested in knowing the total amount of radiation emanating from a human body. For instance, a radioactive substance such as radioactive iodine may be administered to the patient and the physician may desire to know the total amount of this substance within the patient at various times during the treatment. Again, the patient may have been exposed to radiation and the physician desires to know the extent of such exposure, i. e., the amount of radiation which has been absorbed by the body.

In accordance with the invention, the detector is formed of at least two hollow curved shells adapted to be disposed preferably in a vertical position and having such a shape that when the shells are placed together, that is, in their closed position, they can surround a person, the total radiation from whom it is desired to measure. Each hollow shell contains a plurality of gamma ray detectors, preferably of the electrical pulse-producing, gas-amplification type, and provision is made for shielding the detector-containing shells from unwanted external radiation.

While it is contemplated that the radiation detectors may be of any suitable form responsive primarily to gamma radiation, it is preferred that they be of the type disclosed in the U. S. Letters Patent No. 2,397,071, granted March 19, 1946, to D. G. C. Hare. Detectors of this type will be described hereinafter.

For a better understanding of the invention, reference may be had to the accompanying drawing in which Figure 1 is an isometric view, partly diagrammatic, of a radiation detecting instrument in accordance with this invention;

Fig. 2 is a vertical sectional elevation substantially on the line 2—2 of Fig. 1;

Fig. 3 is a plan view of the device of Fig. 1 with the detector in its closed position;

Fig. 4 is a view similar to Fig. 3 but showing a different type of detector and a modification of the external shield; and Fig. 5 is a view similar to Fig. 2 but showing the modification of Fig. 4.

Referring to the drawing, a pair of curved hollow shells 10 and 12 are disclosed in a vertical position, each of the shells being generally in the shape of a half-cylinder and being formed of a suitable material such as sheet metal. Surrounding the external portion of each of the shells 10 and 12 is a similarly shaped shield member 14—16 and in the embodiment shown the shield members are affixed to the shells and provided with one or more hinges 18 so that the shells can be opened as in Fig. 1 or closed as in the position shown in Fig. 3. Within each of the shells 10 and 12 and more or less linearly coextensive therewith is a plurality of gamma ray detectors 20, the detectors being preferably so positioned that, as indicated in Fig. 3, they will fill most of the space within the shells.

The detectors shown in Figs. 1 and 3 are detectors of the type disclosed in the aforementioned Hare Patent No. 2,397,071, and, as described in that patent, each detector is formed of a cylindrical or tubular housing 22, preferably of thin metal within which is disposed a plurality of thin metal discs or plates 24 arranged in parallel spaced relation and connected together electrically by means of the housing 22 to form the cathode electrode of the detector. In the form shown in the drawing, each of the cathode plates 24 is provided with a centrally disposed hole 26 and the holes in the several plates will, of course, be in alignment. Passing through the center of the cathode plate holes is a wire anode 28. As shown diagrammatically in Fig. 1, the several anodes are connected together electrically and through a resistor R to a source of high voltage which is also connected to the cathodes of the detectors. It is understood that each detector cathode plate may be provided with more than one of the holes 26 and the plates so positioned within the housing 22 that the corresponding holes in the different plates will be in series alignment, and that an anode wire will pass axially through each series of holes. Each of the detector housings 22 contains a suitable quench gas filling such, for example, as a mixture of 97% argon and 3% anhydrous ammonia. Each detector housing is, of course, provided with end closure members, not shown, and the pressure of the gas is usually a few inches below atmospheric.

In the embodiment shown in Figs. 1 and 3, the shield members 14 and 16 are shown as being formed of a solid material such as lead, this material being a good absorber for any gamma rays which may tend to enter the detector from the sides and which, if they did so enter, would produce spurious or unwanted counts in the detectors. While a lead shield of from ¼ to ½ inch inch in thickness is usually capable of absorbing most of the gamma rays which would tend to enter the instrument, even such an amount of lead is, of course, very heavy and somewhat unwieldy and the invention therefore also contemplates shield member of the type shown in Figs. 4 and 5. In this embodiment the half-cylindrical shields are formed as hollow shells of sheet metal 30 or the like and adapted to be filled with a good gamma ray absorber such as sulfur 32. The sulfur may, of course, be poured into the shells while molten and will solidify therein. In the form shown in Figs. 4 and 5, the detector shells 10 and 12 are hinged together along one edge as at 34 and the shield members 30 are separately hinged as at 36 so that the shield can be manipulated separately from the detector shells. Again, in the form or embodiment shown in Figs. 4 and 5, the gamma ray detectors are shown in the form of conventional Geiger-Mueller counters, each detector comprising a tubular metal cathode 38 and an axially disposed anode wire 40. If desired, the detectors may be in other forms such as ionizable chambers and proportional counters.

If desired, instead of each individual detector 20 being in the form of a sealed unit, the detector housings 22 may be open at their ends and each shell 10 and 12 then filled with the quenching gas. An arrangement of gamma ray counters disposed in a bundle in a common gas filling is disclosed in the U. S. Letters Patent No. 2,486,944, granted November 1, 1949, to D. G. C. Hare.

When a plurality of gamma ray detectors of the electrical pulse-producing, gas-amplification type are to be used together in one instrument, it is sometimes desirable, instead of connecting all of the cathodes together and all of the anodes together in parallel, to conduct the output of each detector separately to an individual preamplifier and quenching circuit, which circuits are connected in turn to an electronic mixer and amplifier, the output of which is led to a suitable recorder. Such an arrangement is disclosed in the copending application of Arthur H. Lord, Jr., Serial No. 150,427, filed March 18, 1950 and issued on February 1, 1955 as U. S. Patent No. 2,701,312. One of the advantages of such an arrangement is to minimize the electrical capacity which would be present across the several detector electrodes if they were connected in parallel. By so minimizing the electrical capacity, the recovery time, that is, the time required for a pulse or discharge to be stopped or quenched, is materially reduced.

It is to be understood that the top and bottom of each of the shells containing the detectors will be closed by any suitable cover means, not shown. In operation, the detector-containing shells can be closed around a patient and in the form shown in Fig. 4, the shield members 30 will then be closed around the detector shells to exclude external radiation. Although a slight amount of radiation may emanate above the head or below the feet of the patient, this radiation will not be large and can safely be ignored. An important feature of the invention is that the detectors surround the sides of the patient uniformly and therefore respond to substantially the total radiation emanating from the patient's body.

Obviously, many other modifications and variations of the invention as hereinbefore set forth may be made without departing from the spirit and scope thereof, and therefore only such limitations should be imposed as are indicated in the appended claims.

I claim:

1. A device for measuring substantially the total gamma radiation of a human body comprising a pair of elongated half-cylindrical shells, means for hinging said shells together along corresponding adjacent edges so that in the closed position a space or well will be provided, said space being substantially round in horizontal cross section and adapted to accommodate said body, and a plurality of elongated gamma ray detectors disposed in parallel, adjacent relation within said shells, each of said detectors comprising a tubular housing, a plurality of spaced, parallel, thin metallic plates disposed laterally within said housing to form a cathode bank, each of said plates being provided with at least one hole with the holes in the plates being arranged in series alignment, and an anode wire disposed along the longitudinal axis of each series of holes.

2. A device as defined in claim 1 in which the outer surface of each detector-containing shell is surrounded with a similarly shaped shield member containing gamma ray absorptive material.

3. A device as defined in claim 2 in which each shield member is in the form of a curved half-cylindrical hollow shell filled with a gamma ray absorptive material.

4. A device as defined in claim 3 in which the gamma ray absorptive material is sulfur.

5. An annulus of gamma ray detectors enclosed within two sets of semicircular concentric shells, the outer shells being of slightly larger diameter than the inner shells to provide a narrow detector-containing annulus having a width less than half the diameter of the shell, the shells of each set being provided with end plates between the meeting edges of the shells in closed position, and hinge means between the shells to permit swinging opening and closing movement thereof, the space within the inner shells when closed being unimpeded and of sufficient diameter to receive a human body, each of said outer semicircular shells being surrounded by a semicircular member of gamma ray absorptive material, the two semicircular members also being constructed for swinging opening and closing movement.

References Cited in the file of this patent

UNITED STATES PATENTS

| | | |
|---|---|---|
| 2,340,967 | Langer | Feb. 8, 1944 |
| 2,374,197 | Hare | Apr. 24, 1945 |
| 2,443,731 | Herzog et al. | June 22, 1948 |
| 2,458,093 | Muskat et al. | Jan. 4, 1949 |
| 2,486,944 | Hare | Nov. 1, 1949 |

OTHER REFERENCES

"Geiger Counter Tubes," Friedman Reprint from the Proceedings of the I. R. E., vol. 37, No. 7, July 1949, pp. 806, 807.